Jan. 23, 1923.
G. E. CASSEL.
LOCK NUT.
FILED JUNE 10, 1920.
1,443,003.
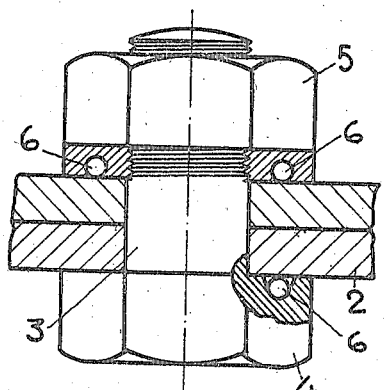
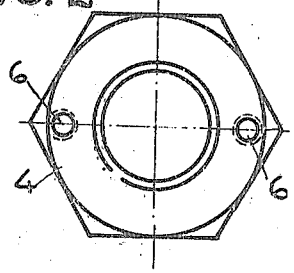

Patented Jan. 23, 1923.

1,443,003

UNITED STATES PATENT OFFICE.

GUNNAR ELIAS CASSEL, OF STOCKHOLM, SWEDEN.

LOCK NUT.

Application filed June 10, 1920. Serial No. 388,010.

*To all whom it may concern:*

Be it known that I, GUNNAR ELIAS CASSEL, a citizen of the Kingdom of Sweden, residing at Stockholm, Sweden, have invented new and useful Improvements in Lock Nuts, of which the following is a specification.

This invention relates to nut locking devices and the object of the invention is to provide a locking device of the said kind in which the friction between the bearing face of the nut or washer and the surface against which the lock nut or washer is screwed is so increased as to secure a reliable locking of the nut.

In the accompanying drawing,

Fig. 1 is an elevation, with parts thereof in section, of a bolt and nut provided with my improved locking means.

Fig. 2 is an end view of the nut.

With reference to Figs. 1 and 2, the numerals 1 and 2 indicate two members to be screwed together. 3 is the stem of the screw bolt, 4 is the head of said bolt, and 5 is the nut engaged by said screw. Formed in the bearing surfaces of the head 4 and of the nut 5 are recesses to receive hardened steel balls 6. For instance there may be two such recesses in each of said surfaces. The balls 6 fit so closely in said recesses that they cannot translate therein and extend slightly above the bearing surface of the nut and that of the screw head.

The degree to which the balls 6 extend beyond the said surfaces should be such that the nut 5, when tightened by a suitable power, will cause the balls 6 to produce permanent deformations of the surfaces of the members 1 and 2 at the points of contact of said balls. The balls will then engage in recesses in said surfaces, thereby securely locking the nut and bolt, so that considerable powers are required to unscrew the nut.

Having now described my invention I declare that what I claim is:—

A nut locking device comprising a nut having axially extending borings of somewhat less depth than their diameter, a hardened steel ball snugly fitting in each of said borings and having a large bearing surface in contact with the bottom of said borings, and a small calotte-shaped surface extending beyond the under side of the nut and adapted to be impressed in the surface against which the nut is tightened.

In testimony whereof I have signed my name.

GUNNAR ELIAS CASSEL.